United States Patent [19]
Watrous

[11] 3,895,265
[45] July 15, 1975

[54] SEQUENCING CIRCUIT FOR FIRING PHOTOFLASH LAMPS IN PREDETERMINED ORDER

[75] Inventor: Donald L. Watrous, Liverpool, N.Y.

[73] Assignee: General Electric Company, Schenectady, N.Y.

[22] Filed: Oct. 24, 1972

[21] Appl. No.: 299,654

[52] U.S. Cl.............. 317/80; 240/1.3; 315/241 P; 315/323; 354/33; 431/95 R
[51] Int. Cl.............................................. F23q 7/02
[58] Field of Search ....... 431/95 R; 315/323, 241 P; 317/80; 354/33, 143; 240/1.3; 250/200

[56] References Cited
UNITED STATES PATENTS

| | | |
|---|---|---|
| 3,518,487 | 6/1970 | Tanaka et al..................... 431/95 X |
| 3,618,492 | 11/1971 | Ellin.................................... 95/11.5 |
| 3,668,468 | 6/1972 | Kornrumpf et al................. 315/323 |
| 3,676,045 | 7/1972 | Watrous et al. ..................... 431/95 |
| 3,699,861 | 10/1972 | Burgarella et al. .................. 95/11.5 |
| 3,748,084 | 7/1973 | Kim ..................................... 431/95 |

Primary Examiner—Volodymyr Y. Mayewsky
Attorney, Agent, or Firm—Norman C. Fulmer; Lawrence R. Kempton; Frank L. Neuhauser

[57] ABSTRACT

A plurality of resistors are successively connected between the junctions of a plurality of series-connected photoflash lamps and semiconductor switch devices of a sequential flashing circuit. The resistors function to provide leakage current paths for the semiconductor switch devices to insure the flashing of the lamps in a desired predetermined order even though one or more of the lamp circuits may be open-circuited.

5 Claims, 1 Drawing Figure

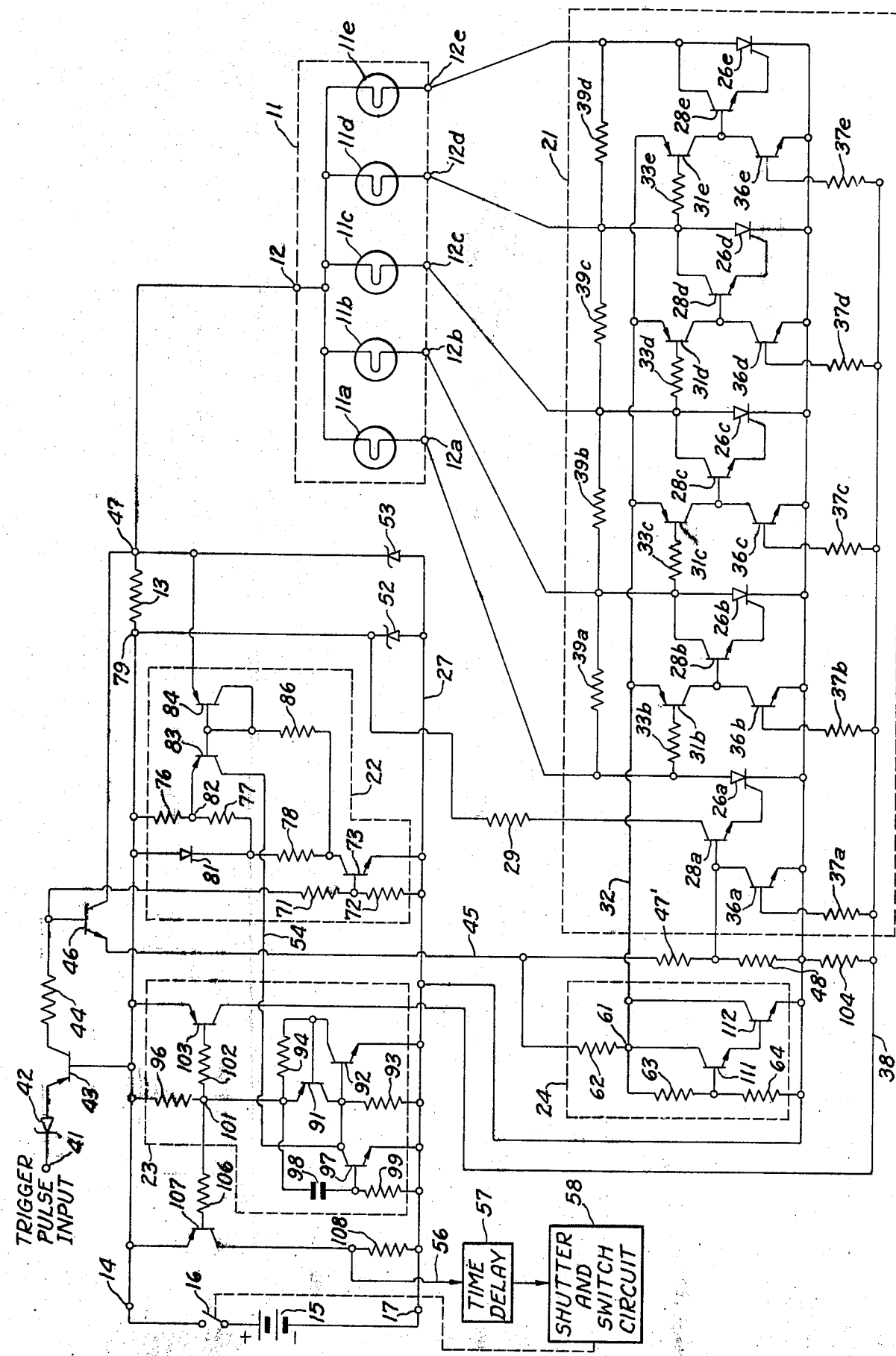

SEQUENCING CIRCUIT FOR FIRING PHOTOFLASH LAMPS IN PREDETERMINED ORDER

CROSS-REFERENCES TO RELATED APPLICATIONS

Patent application Ser. No. 299,652, filed concurrently herewith, Donald L. Watrous, "Compensated Sequencing Circuit for Firing Photoflash Lamps", assigned the same as the present invention.

Patent application Ser. No. 299,653, filed concurrently herewith, Donald L. Watrous, "Current Sensing Circuit for Determining Flashing of a Photoflash Lamp", now U.S. Pat. No. 3,787,167 and assigned the same as the present invention.

Patent application Ser. No. 299,651, filed concurrently herewith, Donald L. Watrous, "Stablized Latching Circuitry in a Sequencing Circuit for Firing Photoflash Lamps", assigned the same as the present invention.

BACKGROUND OF THE INVENTION

The invention is in the field of flash photography, and is particularly directed to circuitry for causing sequential flashing of the lamps in an array of flash lamps.

Various circuits have been devised, for use in a camera or flash attachment, to cause one-at-a-time sequential flashing of the flash lamps of an array of photoflash lamps, so that a different lamp of the array is flashed each time a flash picture is taken. Circuits of this type are disclosed in U.S. Pat. No. 3,676,045 to Donald Watrous and Paul Cote' (assigned the same as this invention). Suitable flash lamp arrays for use with such circuits are disclosed in U.S. Pat. Nos. 3,598,984 to Stanley Slomski and 3,598,985 to John Harnden and William Kornrumpf (both assigned the same as this invention).

The above-referenced Watrous and Cote' circuit employs solid-state switch devices such as SCR's (silicon controlled rectifiers) respectively in series between the flash lamps of the array and a lamp-firing voltage source. Transistor circuitry interconnects these SCR's in a manner for causing them to sequence, quickly and in a predetermined order, to their "on" condition until an unflashed lamp becomes flashed, whereupon current-sensing means responds to the current flow in the flashing lamp and actuates a latch circuit which inhibits further sequencing of the SCR's so that no more than one flash lamp will be flashed per flash picture. The procedure repeats for each flash picture, until all of the lamps of the array have been flashed. For a dual-sided array, having five flash lamps on each side for example, the five lamps on one side are flashed, one-at-a-time, for taking five flash pictures, and then the array is turned around and five more flash pictures are taken. The sequencing circuitry is intended to flash the lamps of an array in a predetermined sequence. Occasionally, one of the flash lamp circuits may have a high resistance or be an open circuit, due to a broken or defective lamp filament, or defective electrical wiring in the array, or a loose array socket connection. When this occurs, the sequencing circuit has an undesirable tendency to sometimes first flash the next lamp after the open circuit, before flashing the intended lamp.

SUMMARY OF THE INVENTION

Objects of the invention are to provide an improved circuit for sequentially flashing the lamps of an array of flash lamps, and to provide such a circuit which will flash the lamps in a predetermined order even though there may be a defective open lamp circuit.

The invention comprises, briefly and in a preferred embodiment, a plurality of resistors successively connected between the junctions of a plurality of series-connected photoflash lamp circuits and semiconductor switch devices of a sequential flashing circuit. The resistors function to provide leakage paths for the semiconductor switch devices to insure that the circuit will flash the lamps in a desired predetermined order even though one or more of the lamp circuits may be of high resistance or open-circuited. Thus, the circuit can distinguish between lamps in an array that have been flashed in desired order and are open-circuited, and any subsequent defective open-circuited lamps or lamp circuits in the array. Preferably, the semiconductor switch devices are SCR's (silicon controlled rectifiers).

BRIEF DESCRIPTION OF THE DRAWING

The single figure is an electrical schematic diagram of a circuit in accordance with a preferred embodiment of the invention.

DESCRIPTION OF THE PREFERRED EMBODIMENTS

A flash lamp array 11 is provided with a plurality of photoflash lamps 11a through 11e, arranged with reflectors if desired, so that each lamp when flashed radiates light in the same direction. If desired, another set of flash lamps may be arranged at the other side of the array, all as described in the above-referenced patents to Slomski and to Harnden and Kornrumpf. A plug-in terminal means 12 is connected to an end of each filament of the lamps 11a through 11e in the array, and additional plug-in terminal means 12a through 12e are respectively connected to the remaining ends of the filaments of the flash lamps. A resistor 13, which functions to sense current flow through a flashing lamp, is connected between the common array terminal 12 and a positive operating potential terminal 14, to which the positive polarity terminal of a battery 15 is connected via a switch 16, the negative terminal of battery 15 being connected to a negative potential terminal 17. The entire circuit, except perhaps for the current-sensing resistor 13, can be manufactured as a monolithic integrated circuit.

The general organization and functioning of the circuit will now be described with reference to the portions of the circuit enclosed by dashed lines, following which the circuit will be described in detail.

A sequencing circuit 21 is connected between the negative voltage supply terminal 17, and the respective terminals 12a through 12e of the flash lamp array 11 and, when a flash picture is taken, it rapidly sequences from lamp to lamp until current from the battery 15 is applied through an unflashed lamp. The current flow through a flashing lamp sets up a voltage drop in the current-sensing resistor 13, which voltage drop is sensed by a current-sensing circuit 22, which actuates a latch circuit 23 for generating an inhibit or lockout signal which is applied to the sequencing circuit 21 so as to stop its sequencing and thus prevent the flashing of more than one lamp while taking the flash picture. This general circuit arrangement and functioning is more fully described in the above-referenced patent to Watrous and Cote'.

A compensator circuit 24 is constructed, and interconnected with the remaining circuitry, so as to apply a variable compensating voltage to the sequencing circuit 21 for causing it to operate properly over wide ranges of operating temperature and of operating voltage as supplied by the battery 15, and over a range of variable compensating current drawn by the sequencing circuit 21.

In the sequencing circuit 21, a plurality of SCR's 26a through 26e, or other suitable semiconductor switching devices having latching characteristics, are respectively connected between the terminals 12a–12e of the flash lamp array 11, and an electrical ground line 27 which is connected to the negative terminal 17 of the operating voltage source. A plurality of gating transistors 28a–28e are respectively associated with the SCR switches 26a–26e, the emitters of the gating transistors being connected to the gate electrodes of the respectively associated SCR switches. The collectors of the gating transistors 28b–28e are respectively connected to the anodes of their associated SCR switches 26b–26e, and the collector of the first gating transistor 28a is connected via a resistor 29 to the positive operating voltage terminal 14. Sequencing transistors 31b–31e are provided in all but the first of the sequencing stages for the purpose of causing sequential activation of the SCR's and also function to apply a compensating voltage to the sequencing circuit as will be described later on. The collector of each of the sequencing transistors 31b–31e is connected to the base electrode of the associated gating transistor 28b–28e of each of the sequencing stages, and the emitters of the sequencing transistors 31b–31e are connected to a compensating voltage line 32. The base electrodes of the sequencing transistors 31b–31e are respectively connected, through resistors 33b–33e, to the anodes of the SCR switches 26a–26d in the successively preceding sequencing stages, as shown.

A plurality of lock-out transistors 36a–36e are respectively associated with the gating transistors 28a–28e, the collector electrodes of the lock-out transistors 36a–36e being respectively connected to the base electrodes of the gating transistors 28a–28e, the emitter electrodes of the lock-out transistors 36a–36e being connected to the electrical ground line 27, and the base electrodes of the lock-out transistors 36a–36e being respectively connected through resistors 37a–37e to a lock-out signal line 38. In accordance with the invention, resistors 39a–39d are respectively interconnected between the anodes of the five SCR's 26a–26e, as shown, and function to insure flashing of the lamps of the array 11 in a predetermined sequence from first to last (that is, so that the first lamp 11a will be the first to flash, and the remaining lamps will flash in sequence until the last lamp 11e is flashed) as will be more fully described. In a successful circuit each of the resistors 39a–39d has a resistance value of 300 ohms.

Operation of the sequencing circuit 21 is initiated by applying a trigger pulse input terminal 41, which terminal is connected via a zener diode 42 to the emitter of a first trigger transistor 43, the base of which is connected to the positive voltage terminal 14. The zener diode 42 is employed only if necessary to adjust the value of the trigger pulse input signal to properly actuate the trigger transistor 43. The collector of transistor 43 is connected via a resistor 44 to the base electrode of a second trigger transistor 46, the collector of which is connected to the low-voltage end 47 of the current-sensing resistor 13. The emitter electrode of the second trigger transistor 46 is connected to the electrical ground line 27 through a pair of series connected resistors 47' and 48, the junction of which is connected to the base of transistor 28a and to the collector of transistor 36a. The trigger pulse may be obtained from a shutter-actuating solenoid, or by means of a switch connected to a suitable voltage source.

Initially, the trigger transistors 43 and 46, and all of the transistors and SCR's in the sequencing circuit 21 are in the "off" condition. When taking a flash picture, or just prior to taking a flash picture, the normally open switch 16 is closed, as may be conveniently done by mechanically linking the switch 16 with the picture-taking button of the camera, in well known manner. A trigger pulse is then applied to the trigger pulse input terminal 41, in synchronization with opening of the camera shutter, thereby rendering first trigger transistor 43 conductive, which in turn renders the second trigger transistor 46 conductive, thus applying a positive voltage potential, via the voltage divider resistors 47' and 48, to the base electrode of the first gating transistor 28a, rendering this transistor conductive and applying a positive potential from positive potential terminal 14, via resistor 29, to the gate electrode of the first SCR 26a, thus rendering this SCR conductive and forming a current path from positive voltage terminal 14 through the current sensing resistor 13, the first flash lamp 11a, and the SCR 26a to the electrical ground line 27 which is connected to the negative voltage terminal 17, whereupon the current flowing through the flash lamp 11a causes the lamp to flash. This current flow causes a voltage to be set up across the current sensing resistor 13. At this point it will be mentioned that a pair of zener diodes 52 and 53 are connected between the respective ends of the current sensitive resistor 13 and electrical ground, as shown, to suppress undesired transient voltages which may appear at the resistor 13. The aforesaid voltage drop across the current-sensing resistor 13 is applied to the current-sensing circuit 22, which functions in a manner to be described to apply a signal via line 54 to the latch circuit 23, which functions in a manner to be described to apply a lock-out signal over the line 38 to the base electrodes of all of the lock-out transistors 36a through 36e in the sequencing ciruit 21, via the resistors 37a through 37e. This renders all of the lock-out transistors 36a through 36e conductive, thus connecting the base electrodes of all of the gating transistors 26a through 28e to electrical ground potential, or so nearly less positive than required for sequencing so that no further sequencing can occur in the sequencing circuit 21 and hence no more lamps in the array 11 will be flashed until the circuit is placed in condition to take another flash picture.

At substantially the same time that the latch circuit 23 produces the lock-out signal over line 38, it also produces a termination signal over a line 56, which is fed through a short time delay circuit 57 to a shutter and switch circuit 58 which functions to close the camera shutter (such as by deactivating the shutter solenoid) and which also functions to open the switch 16 thereby removing battery voltage from the voltage terminals 14 and 17, whereupon all of the transistors and SCR's in the circuit are restored to their initially non-conducting or "off" condition.

When the next flash picture is to be taken, a trigger pulse is again applied to the trigger pulse terminal 41, after closure of switch 16, as described before, resulting in the transistor 28a in the sequencing circuit 21 becoming conductive and applying a positive potential to the gate electrode of the first SCR 28a, as described above. However, since the first lamp 11a has been flashed, and hence is an open circuit, no current will flow through the lamp and thus no current can flow through the SCR 26a via the first lamp 11a. At this time it should be mentioned that the compensating voltage line 32, which is connected to the emitter electrode of each of the sequencing transistors 31b through 31e in the second through fifth sequencing stages, also is connected to the junction 61 of resistors 62 and 63, which are connected in series with a third resistor 64, in the order named, between the emitter electrode of the second trigger transistor 46 and the electrical ground line 27. Since, when a flash picture is being taken, the second trigger transistor 46 is conductive, and its emitter electrode is at a positive potential, the three resistors 62, 63 and 64 function as a voltage divider so that a positive potential, somewhere between electrical ground and the full positive potential at the voltage terminal 14, appears on the line 32. The exact positive potential value on the line 32 fluctuates, with varying temperature and operating voltage, due to action of the compensator circuit 24 as will be described later. When the positive potential is applied to the gate electrode of the first SCR 26a, as had just been described, this SCR is rendered sufficiently conductive to draw current from the positive voltage line 32, through the emitter-base junction of transistor 31b and through the resistor 33b, thus rendering the sequencing transistor 31b conductive in the second stage, which in turn raises the base of the gating transistor 28b sufficiently positive to render this transistor conductive, via current flow through the second lamp 11b of the lamp array 11, and through the collector to the emitter of the transistor 28b, so as to apply a positive potential to the gate electrode of the second SCR 26b, thereby rendering it conductive, whereby a current path is established through the SCR 26b, the second flash lamp 11b, and the current-sensing resistor 13, whereby the second lamp 11b flashes, and the current thereof is sensed by the resistor 13 and associated circuitry, as described above, for producing a lock-out signal on the line 38 whereby no further sequencing can occur, and no further lamps will be flashed until the next flash picture is taken. The aforesaid sequencing from stage to stage in the sequencing circuit 21 occurs so rapidly that all five stages can be sequenced during the time the shutter is open for taking a flash picture, so that when the fifth lamp 11e is flashed, it becomes flashed almost as quickly as did the first lamp 11a. The aforesaid steps of circuit operation for each flash picture, consisting of stage-by-stage sequencing in the sequencing circuit 21 until a flash lamp is flashed, actuation of the current-sensing circuit 22, latch circuit 23, and shutter and switch circuit 58, not only insures that a single flash lamp will be fired when taking a single picture, but also insures that the shutter will thereupon be immediately closed, and the battery switch 16 will be quickly opened, thereby reducing drain on the battery 15.

As had been mentioned, it is desirable that the lamps of an array always be flashed in the same predetermined order. This is because people expect the lamps to always flash in the same order, and also because if a last-flash indicator is associated with the lamp that is to flash last, it may indicate falsely if the lamps do not flash in the intended order. In the sequencing circuit 21, each of the SCR's 26a–26e inherently draws some leakage current, which normally is drawn through the associated series-connected lamp (assuming it is a good lamp that has not been flashed). As described above, when the sequencing circuit 21 is functioning, each SCR 26 associated with a flashed lamp 11 (which therefore is open-circuited) draws current from the line 32 through the succeeding sequencing transistor 31 and resistor 33, and this causes the circuit to sequence to the next unflashed lamp. Now, assuming that the resistors 39a–39d are not in the circuit, and that the array 11 is unused (or that only the first lamp 11a has been flashed) but contains a high resistance or open circuit in the circuit of the third lamp 11c, then when the sequencing circuit is next actuated, the leakage current of the third SCR 26c cannot flow through the defective circuit of lamp 11c, and instead will flow from the line 32 and through the succeeding sequencing transistor 31d and resistor 33d. This, as described above, is the condition for actuating the gating transistor 28d and fourth SCR 26d, for causing the fourth lamp 11d to flash. At the same time, the circuit 21 will be sequencing to the nearest unflashed lamp 11a or 11b. Thus, the circuit can flash either of two lamps. Which of the lamps will be flashed depends on the relative sensitivities of the various sequencing stages. In the example just given, it could be possible that the fourth and fifth lamps would be flashed before the second lamp is flashed.

With the resistors 39a–39d in the circuit, in accordance with the invention, if a lamp circuit should have a high resistance, a sufficient amount of leakage current of the associated SCR will flow to it through good lamps, and through the resistors 39, so as to prevent the above-described flow of leakage current from line 32 through the succeeding transistor 31 and resistor 33. By way of a specific example as given above, with a defective open-circuited third lamp circuit, the third SCR 26c will draw most if its leakage current through resistors 39b and 39c, and lamps 11b and 11d, rather than through the succeeding sequencing transistor 31d and resistor 33d, thus obviating the undesirable tendency of flashing the fourth lamp 11d out of turn.

The current-sensing circuit 22 comprises, in the preferred embodiment shown, a pair of voltage dividing resistors 71, 72 connected in series between the base electrode of the second trigger transistor 46, and the electrical ground line 27. The base electrode of a transistor 73 is connected to the junction of the resistor 71 and 72, the emitter electrode thereof being connected to the electrical ground line 27. Three resistors 76, 77 and 78 are series connected, in the order named, between the high voltage end 79 of the current-sensing resistor 13 (which end is connected to the operating voltage terminal 14), and the collector electrode of the transistor 73. A diode 81 is connected across the two resistors 76 and 77, in the forward biased position as shown, so as to establish a voltage drop of approximately 0.6 volts (assuming diode 81 is a silicon diode) across these two resistors whereupon the junction 82 thereof will have a reference voltage of less than 0.6 volts less than the positive potential at the high voltage end 79 of the current-sensing resistor 13. The junction 82 of the resistors 76 and 77 is connected to the emitter of a transistor 83, the base of which is connected to the base of a transistor 84, the emitter of which is connected to the low voltage end 47 of the current-sensing resistor 13. The collector of transistor 84 is connected jointly to the base electrodes of transistors 83 and 84, and a resistor 86 is connected between this point and the collector electrode of transistor 73. The colletor electrode of transistor 83 is connected to the latching signal output line 54.

The current-sensing circuit 22 functions as follows. The transistors 83 and 84 are connected in a common base differential amplifier circuit, which is rendered operational under the control of transistor 73. The three transistors in the current-sensing circuit 22 are initially in the non-conducting condition, and remain so even after the battery switch 16 is closed in connection with taking a flash picture. When a trigger pulse is appled to the trigger pulse terminal 41, the ensuing positive potential at the base of the second trigger transistor 46 is applied, via voltage divider resistors 71 and 72, to the base of transistor 73, rendering it substantially fully conductive and effectively connecting the lower end of resistor 86 to electrical ground. This actuates the differential amplifier circuit comprising transistors 83 and 84, which generates a positive potential latching output signal at line 54 in response to a sufficient voltage developed across the current-sensing resistor 13 in response to current flow to a flashing lamp in the flash lamp array 11. The threshold of the differential amplifier 83–84 is determined by the relative values of resistors 76 and 77 with respect to the voltage drop across the diode 81. The current-sensing circuit 22 is more fully described and claimed in the above-referenced patent application Ser. No. 299,653 U.S. Pat. No. 3,787,167.

The latch circuit 23 receives the incoming latching signal over line 54 from the current-sensing circuit 22, and in response thereto produces a lock-out signal on the line 38 which is applied to the sequencing circuit 21 as has been described above. The latch circuit 23 comprises a pair of transistors 91, 92 connected together in a regenerative feedback manner, the base of transistor 91 being connected to the collector of transistor 92 and the base of transistor 92 being connected to the collector of transistor 91, so that the two transistors become conductive simultaneously when actuated. The base of transistor 92 and collector of transistor 91 are connected together and to electrical ground via a resistor 93, the emitter of transistor 91 is connected jointly to the base of transistor 91 and collector of transistor 92 via a resistor 94, and also is connected to the positive operating voltage terminal 14 via a load resistor 96. The emitter of transistor 92 is connected to the ground line 27. An actuating transistor 97 has its emitter connected to electrical ground, and its collector is connected jointly to the collector of transistor 91 and base of transistor 92, and also is connected to the incoming latching signal line 54. The base of transistor 97 is connected to the junction of a capacitor 98 and a resistor 99 which are series connected, in the order named, between the emitter of transistor 91 and electrical ground. The value of the capacitor 98 may be very small, so that it can be formed as an integral part of a monolithic integrated circuit.

When an incoming positive potential latching signal appears on the line 54, jointly at the collector of transistor 91 and base of ransistor 92, these transistors become conductive simultaneously, producing a negative going voltage at the junction 101 of the load resistor 96 and emitter of transistor 91, which negative going voltage is applied via a resistor 102 to the base of an amplifier transistor 103 the emitter of which is connected to the positive operating voltage terminal 14, and the collector of which is connected to the lock-out signal line 38, whereby a positive going lock-out voltage is produced on the line 38 upon actuation of the latch circuit 23. A resistor 104 is connected between line 38 and the ground line 27. The transistor 97, and capacitor 98 and resistor 99, comprise a transient voltage blocking circuit, to prevent false actuation of the latching circuit due to transient voltages which may appear in the electrical line connected to the positive operating voltage terminal 14. If such a transient voltage should appear, of positive potential, it is applied via capacitor 98 to the base electrode of transistor 97, rendering this transistor conductive and substantially electrically grounding the base electrode of the transistor 92, thereby preventing the latching transistors 91 and 92 from being falsely rendered conductive by a transient voltage. The latch circuit 23 and its transient voltage blocking feature comprising transistor 97, capacitor 98 and resistor 99, is more fully described and claimed in the above-referenced patent application Ser. No. 299,651.

The lock-out signal point 101 is connected via a resistor 106 to the base of an amplifier transistor 107, the emitter of which is connected to the positive operating voltage terminal 14, and the collector of which is connected to elecrical ground via a load resistor 108. The termination signal line 56, which has been described above, is connected to the collector of the transistor 107.

The compensator circuit 24 is provided with a transistor amplifier, consisting of a pair of cascade-connected transistors 111 and 112 in the preferred embodiment, connected in series with a load resistor or other current feed means 62, this series combination being connected between the electrical ground line 27 and the emitter of the second trigger transistor 46 (at which the sequence-actuating signal appears when a flash picture is taken). The base of transistor 111 is connected to the junction of resistors 63 and 64, the collector thereof is connected to the junction 61 of resistors 62 and 63, and the emitter thereof is connected to the base of transistor 112. The emitter of transistor 112 is connected to the electrical ground line 27, and the collector thereof is connected to the junction 61 of resistors 62 and 63.

The compensator circuit 24 functions as follows. When a flash picture is taken, a sequence-actuating signal is applied via the line 45, to the sequencing transistor 28a in the first sequencing stage, via the voltage divider comprising resistors 47 and 48, as has been described above. The sequence actuating signal, which is of positive voltage polarity, also is applied, from the junction 61 in the voltage divider network of resistors 62, 63 and 64, to the line 32 and hence is applied to the emitter electrodes of the sequencing transistors in each of the sequencing stages (except for the first stage), and is of such a value as to enable the sequencing stages to properly sequence from one stage to the next, until a flash lamp is flashed. The value of the sequencing control voltage on line 32 is affected by the transistor amplifier arrangement comprising one or more cascaded transistors 111–112 connected in series with the resistor 62 functioning as a load circuit for the amplifier. The voltage divider resistors 63 and 64 are such as to apply a bias voltage to the base of the first amplifier transistor 111, so that the amplifier 111–112 is partially conductive. Therefore, if the battery operating voltage applied across terminals 14 and 17 should increase from optimum value, relatively greater bias voltage is applied to the base electrode of the first amplifier transistor 11, rendering the amplifier transistor 111–112 relatively more conductive, thus drawing more current through their load resistor 62, and thus lowering the D.C. voltage at the line 32, thereby partially compensating for the tendency for this voltage to increase due to the increased voltage of battery 16. If the voltage of the battery 16 should decrease, for instance to as low as 4 volts from its nominal value of 6 volts, the transistor amplifier 111–112 will become relatively less conductive, thereby drawing less current through the load resistor 62, whereby the D.C. voltage at line 32 will be relatively greater than it would otherwise become due to the lower voltage of the battery 16. A single transistor 111 will suffice, but will provide different voltage compensation, whereas additional amplifier transistors cascaded to the second transistor 112 in the same manner as the transistor 112 is connected to the transistor 111, will provide still different control on the value of D.C. voltage at the line 32. Also, changing the relative values of resistors 63 and 64 will change the operating characteristics of the circuit. Without the aforesaid voltage compensation, a reduction in voltage of the battery 16 might tend to cause the sequencing circuit 21 to fail to sequence, resulting in failure of a lamp to flash when taking a flash picture. Conversely, if the voltage of battery 16 were to increase, without the compensating circuit 24, the sequencing circuit 21 might tend to falsely sequence one or more times in addition to the desired flashing of a single lamp, resulting in the flashing of two or more lamps per flash picture.

The compensator circuit 24 also compensates with respect to changes in operating temperature. Semiconductors, such as the SCR's and sequencing transistors 26 and 31 in each of the sequencing stages, have an inherent temperature coefficient, typically minus 2 millivolts per degree C, whereby with increasing operating temperature the optimum operating voltage should be decreased by a corresponding amount. The transistor amplifier 111–112 has substantially the same temperature coefficient as the sequencing transistors, thereby to vary the compensator voltage value on line 32 in a direction to compensate for the temperature-dependent varying operating characteristics of the sequencing and gating transistors 31 and 28.

The compensating voltage at line 32 also is regulated, by the compensator circuit 24, with respect to the successively increasing amounts of compensating current drawn by the emitters of the sequencing transistors 31 as each of the second through fifth lamps 11b–11e is flashed. This increasing current is due to the fact that an additional successive sequencing transistor 31 draws emitter current as each successive lamp is flashed. As the compensating current thus increases, the voltage drop across the resistor 62 (through which the compensating current flows) tends to increase, thus tending to reduce the value of compensating voltage at line 32. However, this tendency toward reduced voltage results in reduced bias (via resistance voltage divider 63–64) at the base of transistor 111 (and also 112), whereby the transistors draw less current through the resistor 62, resulting in a substantially constant regulated compensating voltage at line 32 with respect to variation in current flow therein.

The collector electrode of the second trigger transistor 46 is connected to the low voltage end 47 of the current sensing resistor 13, rather than being connected to the positive voltage supply terminal 14. Because of this connection to the low voltage end 47 of resistor 13, when a lamp in the array flashes, the voltage drop across the resistor 13 due to the current flow therein, brings down the voltage at point 47 to a value substantially less than the 6 volt nominal operating voltage of battery 16, for instance to as low as 1 or 2 volts temporarily, and this considerably lower voltage is passed along the line 45 to the load resistor 62 of the compensator circuit 24. Remembering that the circuit 24 does not provide perfect voltage compensation, i.e., it is not a voltage regulator, but instead is a voltage modifier (with respect to the operating input voltage), the voltage at line 32 will also become reduced, thus tending to prevent any further sequencing in the circuit 21 and helping to insure that only a single lamp in the array 11 will be flashed per flash picture.

The improved sequencing circuit achieves the objectives of insuring reliable firing of the flash lamps of an array of lamps in a predetermined order from first to last, even if one of the lamp circuits should be open-circuited or of high resistance due to a faulty lamp, faulty wiring, or loose socket connection.

While preferred embodiments of the invention have been shown and described, various other embodiments and modifications thereof will become apparent to persons skilled in the art, and will fall within the scope of invention as defined in the following claims. For example, the semiconductor devices can be turned around and connected in reverse in their positions in the circuit, and PNP transistors can be substituted for NPN transistors, and vice versa, along with reversal of polarity of the operating voltage source.

What I claim as new and desire to secure by Letters Patent of the United States is:

1. A sequencing circuit for sequentially flashing a plurality of photoflash lamps which normally become open-circuited upon flashing, said circuit comprising a plurality of semiconductor switch devices respectively adapted to be connected in series with the lamp circuits of said plurality of flash lamps, and sequencing circuitry stages successively connected between said semiconductor switch devices, said switch devices having the characteristic of drawing leakage current when said circuit is sequencing, said leakage current for each said switch device being drawn through its series-connected lamp if the lamp is unflashed and has a relatively low resistance and being drawn through the succeeding sequencing stage if its series-connected lamp has a relatively high resistance, wherein the improvement comprises a plurality of resistors successively connected between said switch devices so as to be successively connected between the junctions of the series-connected circuits of the switch devices and lamp circuits when the lamp circuits are connected to said sequencing circuit, said resistors having resistance values to provide said leakage current to any of said switch devices having in series therewith a defectively high resistance lamp, thereby assuring that the lamps will flash in a predetermined order.

2. A circuit as claimed in claim 1, in which each of said resistors has a resistance value of approximately 300 ohms.

3. A circuit as claimed in claim 1, in which said semiconductor switch devices comprise SCR's (silicon controlled rectifiers) having anode and cathode current electrodes respectively connected in said series-connected circuits.

4. A circuit as claimed in claim 3, in which each of said sequencing circuitry stages comprises a transistor, means connecting the base electrode of each transistor to the series-circuit junction of the preceding stage, and means connecting the collector and emitter electrodes of said transistors in current paths between a circuit point of voltage and the gate electrode of the next succeeding SCR.

5. A circuit as claimed in claim 4, in which each of said resistors has a resistance value of approximately 300 ohms.

* * * * *